United States Patent [19]

Cole

[11] Patent Number: 4,555,428
[45] Date of Patent: Nov. 26, 1985

[54] MULTI-LAYER UNITIZED FABRIC CONSTRUCTION AND METHOD OF MAKING SAME

[75] Inventor: Tyler L. Cole, Asheboro, N.C.

[73] Assignee: Stedman Corporation, Asheboro, N.C.

[21] Appl. No.: 367,927

[22] Filed: Apr. 13, 1982

[51] Int. Cl.⁴ .............................................. B32B 3/06
[52] U.S. Cl. .......................................... 428/102; 2/97;
 2/272; 112/441; 428/124; 428/192; 428/193;
 428/225; 428/253
[58] Field of Search ............... 428/192, 193, 246, 247,
 428/253, 284, 287, 102, 103, 104, 176, 296, 124;
 2/97, 272; 112/441

[56] References Cited

U.S. PATENT DOCUMENTS

| 1,751,027 | 3/1930 | Boix | 2/272 |
| 1,777,421 | 10/1930 | Waters | 2/272 |
| 1,968,409 | 7/1934 | Liebowitz | 2/272 |
| 1,968,410 | 7/1934 | Liebowitz | 2/272 |
| 1,995,187 | 3/1935 | Lind et al. | 2/272 |
| 2,020,070 | 11/1935 | Liebowitz | 2/272 |
| 2,021,833 | 12/1935 | Campbell | 2/272 |
| 2,035,766 | 3/1936 | Schramm, Jr. | 2/272 |
| 2,083,199 | 6/1937 | McBurney et al. | 428/249 |
| 2,263,900 | 11/1941 | Nollan | 428/249 |
| 2,264,224 | 11/1941 | Swan | 428/249 |
| 2,312,925 | 3/1943 | McBurney et al. | 428/249 |
| 4,333,980 | 6/1982 | Russell | 428/198 |

Primary Examiner—James J. Bell
Attorney, Agent, or Firm—Pennie & Edmonds

[57] ABSTRACT

A multi-layer unitized fabric construction and a method of making the same where the construction has top and bottom outer facing layers of shell fabric separated by a layer of a fusible lining fabric and a layer of adhesive with all of the layers being adhered together to form a single unitized structure.

11 Claims, 16 Drawing Figures

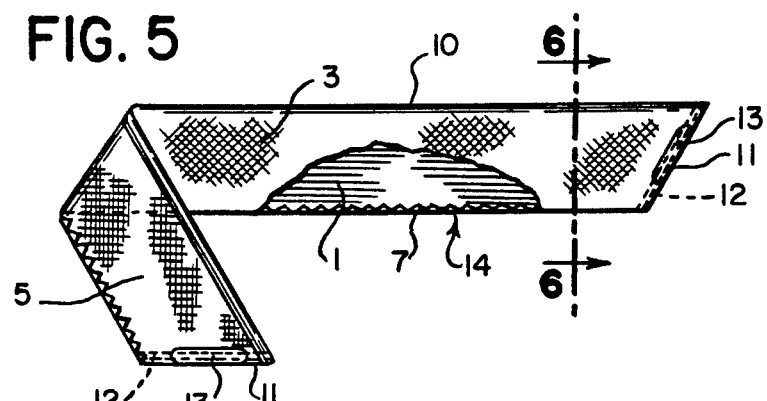
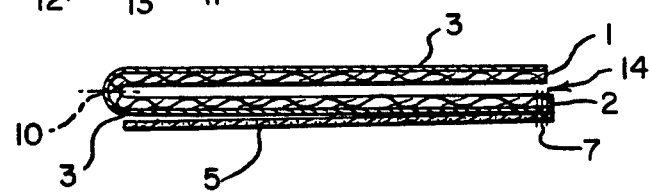
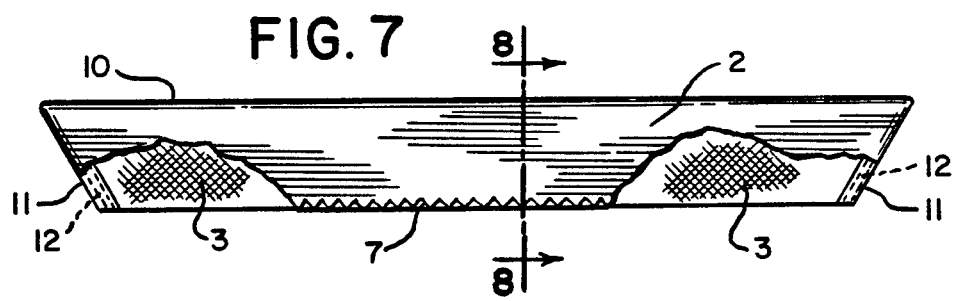
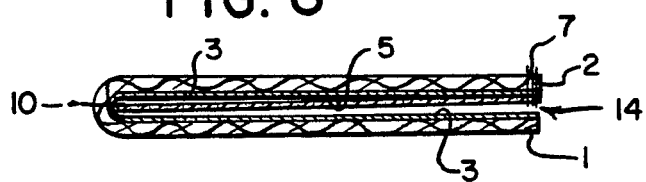
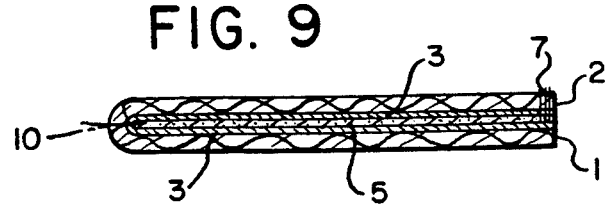

MULTI-LAYER UNITIZED FABRIC CONSTRUCTION AND METHOD OF MAKING SAME

TECHNICAL FIELD

The invention relates to a multi-layer unitized fabric construction forming garment parts, for example collars or cuffs, and a method for making the same.

BACKGROUND OF THE INVENTION

Garment parts such as collars, cuffs, facings or pocket flaps are often made of heavier or stiffer fabric construction than the remainder of the garment in order to improve the appearance of the garment as well as to increase wrinkle resistance. Often these parts are made from two or more separate layers of a shell fabric material which are lined with a separate inner lining joined together to form the individual garment part.

Current manufacturing processes for making such garment parts include sandwiching an inner lining layer between two outer layers of shell fabric and joining the two outer layers of shell fabric together about their peripheries by sewing or tacking as shown in FIG. 1 of the drawings. A further process as shown in FIG. 2 of the drawings involves fusing a layer of lining material to either the top or bottom outer shell fabric layer after which the two shell fabric layers are joined together around their peripheries by sewing or tacking.

Both of the forementioned current processes present problems because the separate layers of material used in the construction of the individual garment part usually have different physical properties in terms of fabric content, fiber construction, density, shrinkage and stress characteristics, and sewability.

The first mentioned process of attaching all three layers together by sewing around the peripheries of the different layers forming the part involves leaving an open unjoined portion of the periphery which is later joined to the garment. Often the inner lining layer has different stretch-shrinkage characteristics than that of the outer layers of shell fabric such that during washing and drying of the garment, the difference in the stretch-shrinking properties results in a wrinkled or misshapen garment part. In addition the sewing method of joining the layers together may cause puckering or a change in part dimension as a result of the sewing process. This is because different layers of the garmant part may react differently to the feed mechanism of a sewing machine, to the tension applied to the individual layers during the sewing process, to the needle heat generated by the needle penetrating the multilayers of fabric and to the particular thread-type used.

The method of fusing a fusible inner lining to one of the outer shell fabrics as outlined in the second process described above does not overcome all of the problems associated with the first described process since the shrink-stretch characteristics of the inner lining may differ from the shrink-stretch characteristics of the other layer of shell fabric to which it is not fused. Further since the same sewing methods are used as in the first mentioned process, the same problems of puckering may still occur. The second process does result in some improvement in that the inner lining between the two outer shell fabrics is affixed throughout to one of the shell fabrics thus minimizing some difference in shrinkage and stretch co-efficient since there are only two parts of the garment part which are movable with respect to each other rather than three as in the first described process.

It is therefore an object of my invention to provide for a multi-layer fabric construction which neutralizes the difference in shrink and stretch co-efficients between the individual layers of fabric and which at the same time improves sewability of the various layers.

GENERAL DESCRIPTION OF THE INVENTION

Broadly a multi-layer fabric construction according to my invention comprises top and bottom layers of shell fabric which are separated by at least one-fusible lining layer and at least one adhesive layer and where all the layers are adhered together to form a single unitized structure. In this manner the resultant unitized structure will hold its shape even though the various components of the structure may have different stretch and shrinkage properties because the separate components are adhered together over their complete area. In all forms of the fabric construction according to the invention, the fusible lining layer is adhered to one of the shell fabric layers to form a composite layer.

In one form of the invention the adhesive layer is joined along one edge to the lining side of the composite layer and where the adhesive layer has a width one-half that of the composite layer. The composite layer is then folded on itself along a fold line to form two inner facing layers of shell fabric, one outer facing layer of lining and one outer facing layer of adhesive. All the layers are joined, as for example by sewing, along their edges adjacent the fold line leaving an unjoined portion along edges opposite the fold line. The resultant assemblage is then turned inside out through the unjoined portion such that the two layers of shell fabric face outwardly and two layers of lining face inwardly opposite each other and are separated by the adhesive layer. All the layers are then adhered together by the application of heat and pressure to form a single unitized construction.

In a further form of the invention, the composite layer is assembled with the adhesive layer and a further layer of shell fabric such that the shell fabric side of the composite layer overlies the further layer of shell fabric which in turn overlies an adhesive layer. All of the layers are joined together partially around their peripheries by sewing or other means leaving an unjoined portion adapted for later attachment to a garment. The resultant construction is then turned inside out as in the prior described embodiment such that the layer of shell fabric face outwardly and the lining layer of the composite layer and adhesive layer face inwardly opposite each other. The construction is then subjected to heat and pressure to adhere all the layers together into a single unitized construction.

In a still further embodiment of the invention, adhesive is applied to both side of a lining layer and the lining layer brought into contact with a layer of shell fabric to form a composite layer. This composite layer is then folded on itself in the manner as previously described such that two inwardly facing layers of shell fabric oppose each other. The edges of the layers adjacent the fold line are joined together by sewing or other means leaving an unjoined portion opposite the fold line. The resultant construction is then turned inside out through the unjoined portion opposite the fold line as previously described such that the shell fabric faces outwardly of the construction. The layers are then subjected to heat and pressure to adhere the same together throughout their complete areas to form a unitized construction.

BRIEF DESCRIPTION OF THE DRAWINGS

FIG. 5 is a view of the front and back sides of the composite layer of FIG. 4 folded upon itself along a fold line;

FIG. 6 is an enlarged cross-sectional view of FIG. 5 taken along line 6—6;

FIG. 7 is a broken plan view of the fabric construction of FIG. 5 turned inside out;

FIG. 8 is an enlarged cross-sectional view of FIG. 7 taken along line 81'8;

FIG. 9 is a view similar to FIG. 8 after the various layers have been subjected to heat and pressure;

DETAILED DESCRIPTION OF THE INVENTION

Figure 1:
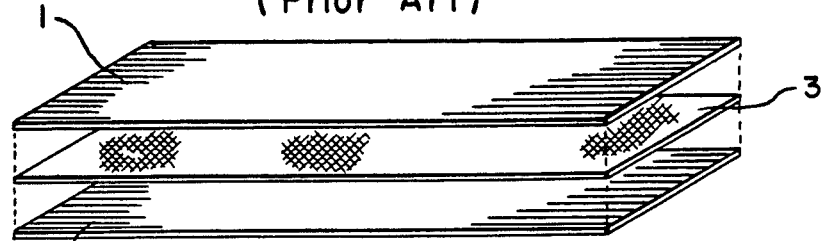
FIG. 1 is a schematic view of a partially assembled multi-layer fabric construction according to a prior art process.

Referring to the drawings in which similar parts have the same identifying numerals, there is illustrated in FIG. 1 an assembly of layers as utilized in a prior art process in which a top layer of shell fabric 1 is joined to a bottom layer of shell fabric 2 and which has interposed therebetween a lining layer 3. The layers 1 and 2 are joined together by stitches (not shown) about their peripheries to form a garment part such as, for example, a collar, cuff or pocket flap. Because the separate layers are only joined together at their peripheries, they are free to move with respect to each other as may be caused by different stretch or shrinkage characteristics with the result that the garment part formed by the fabric construction may be subjected to wrinkling or becoming misshapen.

Figure 2:
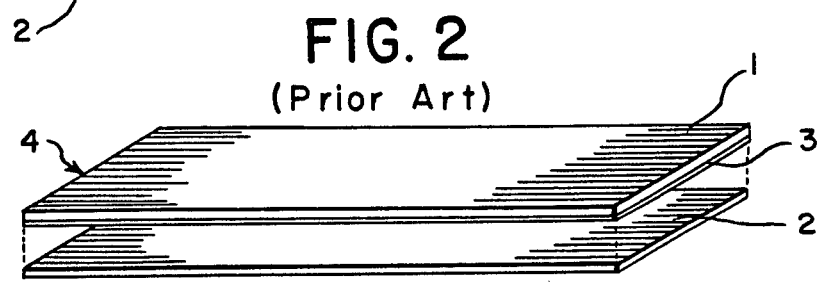
FIG. 2 is a schematic view of a partially assembled multi-layer fabric construction according to a further prior art process.

A further prior art construction is shown in FIG. 2 wherein one of the shell fabrics, in this case the top layer 1 of shell fabric, has the lining layer 3 fused thereto throughout the complete area of the lining layer to form a composite layer 4. The composite layer is joined to the bottom layer 2 of shell fabric by stitches (not shown) extending around the periphery of the layers as in the manner described with respect to the fabric of FIG. 1. Relative movement between the several layers of fabric is reduced from that shown in the construction of FIG. 1 in that there is no relative movement between layers 1 and 3 in the embodiment of FIG. 2. However there still may be relative movement between the composite layer 4 and the bottom layer 2 which can result in objectionable wrinkling or misshaping of a garment part.

Figure 3:
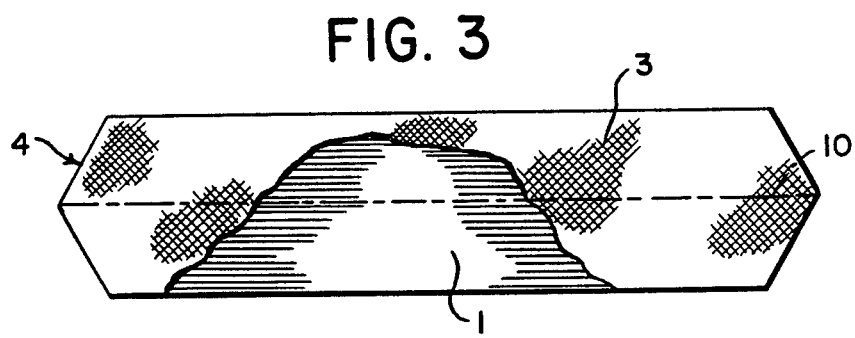
FIG. 3 is a broken plan view of a composite layer utilized in one form of a multi-layer fabric construction according to the invention.
Figure 4:
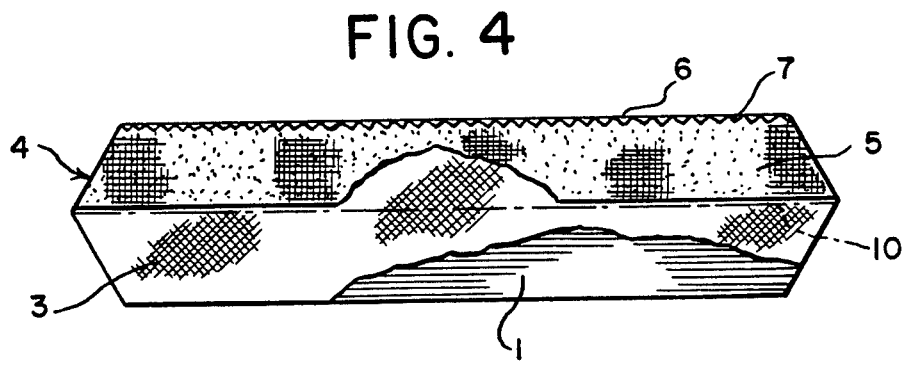
FIG. 4 is a broken plan view of the composite layer of FIG. 3 having an adhesive layer joined thereto.

Referring to FIG. 3 there is illustrated a composite layer 4 according to the invention cut in a shape so as to form a collar. The composite layer includes a layer 1 of shell fabric which is fused to a layer 3 of lining fabric. The layer of shell fabric may comprise a knitted or woven fabric while the layer 3 of lining fabric may comprise a fusible material, preferably a non-woven polyester material, which is fused onto the shell fabric by the application of heat and pressure by way of a conventional fusing machine. The fused material may be directly fusible onto the shell material to adhere thereto or may be adhered by way of an adhesive applied to either the shell material or to the lining material. I have found that where both the fusible lining material and the shell material comprise webs, they may be progressively fused together on a conventional belt fed fusing machine utilizing pressures on the order of 65 psi, a temperature of approximately 280° F. and a belt speed of 41.5 ft./min.

An adhesive layer 5 of a material which becomes adhesive upon the application of heat is joined along an upper edge 6 thereof to the composite layer 4 by sewing 7 or other means. As shown the layer of adhesive material 5 is one-half the width of the composite layer.

Referring to FIGS. 5 and 6, the composite layer 4 is folded upon itself along a fold line 10 such that the layer of shell material 1 forms two inner layers 1 and 2 which face each other and such that the lining layer 3 faces outwardly of the layers 1 and 2. All of the layers are then joined together along their edges 11 adjacent the fold line 10 by stitching 12 or other means. At this time plastic stiffening tabs 13 may be included in the collar construction if desired.

The construction of FIG. 5 is then turned inside out through an open end 14 opposite the fold line 10 which is not joined together by sewing such that the fabric construction takes the form shown in FIGS. 7 and 8. Turning the construction of FIG. 5 inside out moves the layers 1 and 2 of the shell fabric outwardly of the construction to form the top layer 1 and the bottom layer 2 of shell fabric while at the same time the lining layer 3 as well as the adhesive layer 5 are positioned between the top and bottom layers 1 and 2.

The fabric construction as shown in FIGS. 7 and 8 is then subjected to a heat and pressure treatment to cause the adhesive layer 5 to adhere with the lining layer 3 with the result that all the layers are adhered together to form a unitized structure as shown in FIG. 9. Since all of the layers are adhered together over their complete areas, there can be no relative movement between the layers as might result from different shrinkage or stretch characteristics between the several layers causing wrinkling or misshaping of a garment part. Where an adhesive is used to apply the fusible material to either the shell material or to the lining material, the adhesive is of a permanent type to provide the unitized structure to prevent relative movement between the several layers of material as might result from shrinkage during laundering.

The completed garment part, in this case a collar, is then fixed to a garment by stitching along the open end 14 thereof.

Figure 10:
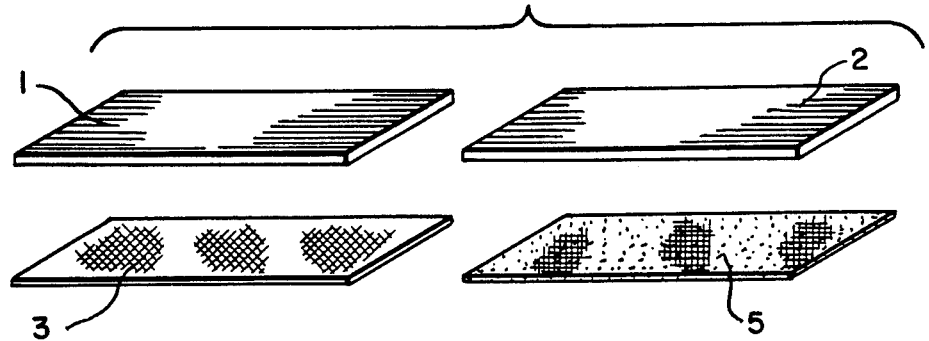
FIG. 10 is an exploded view of layers of a further embodiment of a multi-layer fabric construction according to the invention.
Figure 11:
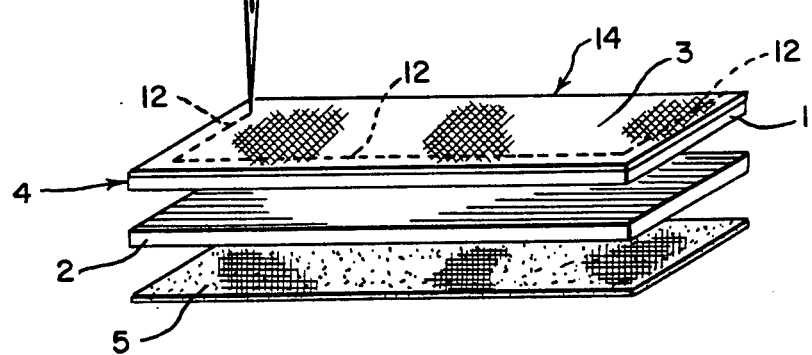
FIG. 11 is a schematic view illustrating assembly of the layers of FIG. 10.
Figure 12:
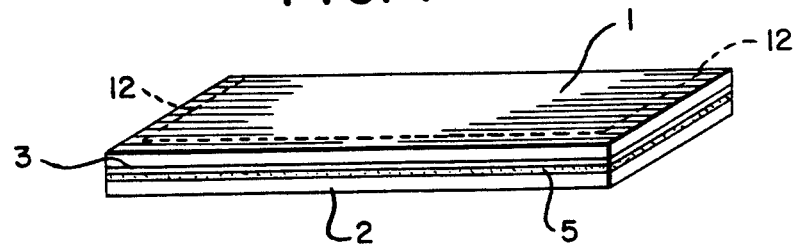
FIG. 12 is a cross-sectional view of the multilayer unitized fabric construction formed by the assembly of the layers shown in FIG. 11.

Referring to FIG. 10 there is illustrated a further embodiment of a multi-layer unitized fabric constructed according to the invention in which the layer 3 of fusible lining material is fused onto a layer of shell fabric which may comprise either layer 1 as shown in FIG. 10 or layer 2 to form a composite layer. The several layers are then assembled in the manner as shown in FIG. 11 such that the composite layer 4 formed by the layer 1 of shell fabric and the layer 3 of fusible lining overlie the other layer 2 of shell fabric which in turn overlies a layer 5 of adhesive. All of the layers are then joined along a major part of their outer peripheries, as for example by sewing 12, as shown in FIG. 11 leaving one end 14 of the layers unjoined. The assembly of layers is then turned inside out through the open end 14 with the result that the layers 1 and 2 of shell fabric become outer facing layers with the adhesive layer 5 being interposed between the lining layer 3 and the layer 2 of the shell fabric. The resultant assembly is then subjected to pressure and heat to adhere all the layers together as shown in FIG. 12.

Figure 13:
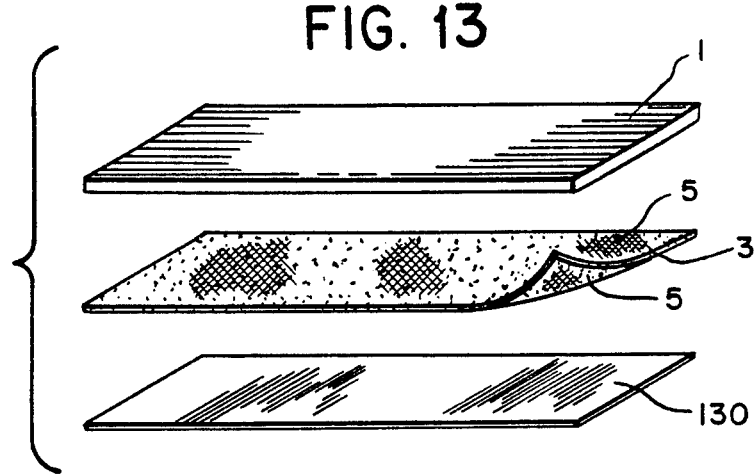
FIG. 13 is an exploded view of layers prior to assembly of a multi-layer fabric construction according to a still further embodiment of the invention.
Figure 14:
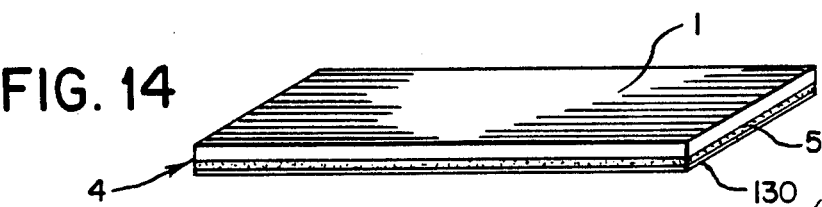
FIG. 14 is a view of the assemblage of the layers of FIG. 13.
Figure 15:
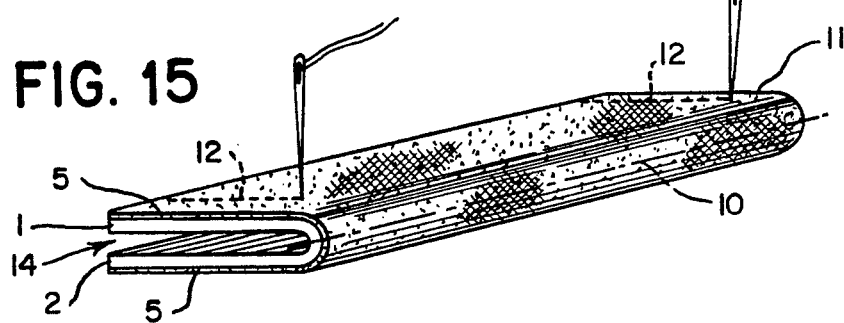
FIG. 15 is a view of the layers of FIG. 14 folded upon themselves and illustrates the manner of joining the layers; and, FIG. 16 is a cross-sectional view of the multi-layer fabric construction resulting from the assemblage of layers as indicated in FIG. 15.
Figure 16:
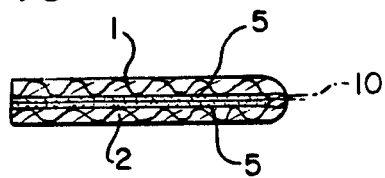

Referring to FIG. 13 there is illustrated an even further embodiment of a multi-layer unitized fabric constructed according to the invention. In this embodiment a layer 3 of lining material is coated on both sides with an adhesive to form adhesive layer 5 after which the lining layer is brought into contact with a layer 1 of a shell material to form a composite layer 4. The opposite side of layer 3 from the shell material has release paper 130 attached thereto to prevent the adhesive layer on the lining material from adhering to a belt (not shown) which moves the layers through a fusing machine in which the lining layer 3 is adhered to the layer 1 to form the composite layer as shown in FIG. 14. The release paper 130 is then removed and the composite layer 4 is folded upon itself as shown in FIG. 15 along a fold line 10 such that the shell fabric forms two inner facing layers 1 and 2 which are opposite to one another and wherein the adhesive layer 5 on the side of the lining opposite the layer 1 faces outwardly on both sides of the construction. The layers are then joined along their edges 11 adjacent to the fold line 10 by sewing 12. The resultant construction is then turned inside out through the open end 14 of the folded construction which is not joined together by stitching such that the two layers 1 and 2 of shell fabric face outwardly of the folded construction and the adhesive layers 5 face inwardly and are opposite to each other. The folded construction is then subjected to heat and pressure to adhere all the layers together as shown in FIG. 16.

The pressures and temperatures involved in adhering the layers together in all embodiments of the invention fall within conventional ranges and are on the order of 65 psi and 280° F. at a belt speed of 41.5 ft./min. through the fusing machine.

It has been found that multi-layer unitized fabrics constructed following the methods as set out above produce multi-layer fabrics having a minimum of the objectionable features associated with the prior art fabrics as previouly discussed.

I claim:

1. A multi-layer unitized fabric construction comprising a single layer of shell fabric having a single fusible liner layer adhered thereon to form a composite layer folded on itself to form top and bottom shell fabric layers and two opposed layers of fusable lining therebetween and a permanent adhesive layer interposed between the two opposed layers of fusible lining with all of the layers being adhered together to form a single unitized structure.

2. A multi-layer unitized fabric construction according to claim 1 where said layers are joined together partially around their peripheries leaving an unjoined portion adapted for later attachment to a garment.

3. A multi-layer unitized fabric construction according to claim 2 wherein said layers are joined together by stitching.

4. A multi-layer unitized fabric construction according to claim 1 wherein said adhesive layer is joined by stitching along one edge thereof to an edge of said composite layer.

5. A method of making a multi-layer permanently unitized fabric construction having a top layer of shell fabric, a bottom layer of shell fabric, and at least one fusible lining layer and at least one permanent adhesive layer interposed between the top and bottom layers of shell fabric; comprising the step of adhering a lining layer onto a single layer of shell fabric to form a composite layer, the step of joining the lining layer to a permanent adhesive layer, the step of folding said composite layer on itself along a fold line to form top and bottom lining layers and to form top and bottom layers of shell fabric opposing each other and whereby the adhesive layer faces outwardly along a side of the folded construction, the step of joining the layers together along their edges adjacent the fold line leaving an unjoined portion opposite the fold line, the step of turning the folded construction inside out through the unjoined portion, and the step of adhering the layers together by application of heat and pressure.

6. A method according to claim 5 wherein the step of joining the lining layer to a permanent adhesive layer includes joining one edge of the adhesive layer to one edge of the composite layer.

7. A method according to claim 6 wherein the step of joining one edge of the adhesive layer to one edge of the composite layer is by sewing.

8. A method according to claim 5 wherein the step of joining the layers together along edges adjacent the fold line is by sewing.

9. A method according to claim 5 wherein the step of adhering the lining layer onto said single layer of shell fabric includes applying a first layer of adhesive to one side of the lining layer and bringing the first layer of adhesive into contact with said single shell fabric to form the composite layer.

10. A method according to claim 9 wherein the step of joining the lining layer to an adhesive layer includes applying a second layer of adhesive to the opposite side of the lining layer than the first layer of adhesive.

11. A method according to claim 10 including in addition the step of folding the composite layer including the second layer of adhesive onto itself along the fold line whereby the second layer faces outwardly of the folded construction, the step of joining the layers together along edges adjacent the fold line while leaving an unjoined portion opposite the fold line, and the step of turning the folded construction inside out through the unjoined portion.

* * * * *